(12) United States Patent
Price et al.

(10) Patent No.: US 10,924,442 B2
(45) Date of Patent: Feb. 16, 2021

(54) CONVERSATION AGENT FOR COLLABORATIVE SEARCH ENGINE

(71) Applicant: Capital One Services, LLC, McLean, VA (US)

(72) Inventors: Micah Price, Plano, TX (US); Praveen Kumar Gadipelly, Frisco, TX (US); Dinesh Sundaram, Plano, TX (US); Chaofeng Xu, Plano, TX (US); Sripavan Sanka, Plano, TX (US); Sandeep Manepalli, Little Elm, TX (US); Jayson Sellers, Flower Mound, TX (US); Olalekan Awoyemi, Prosper, TX (US); Staevan Duckworth, The Colony, TX (US); Kasey Greuner, Bedford, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/292,595

(22) Filed: Mar. 5, 2019

(65) Prior Publication Data

US 2020/0287856 A1    Sep. 10, 2020

(51) Int. Cl.
| | |
|---|---|
| *G06F 15/16* | (2006.01) |
| *G06F 17/00* | (2019.01) |
| *G06Q 10/10* | (2012.01) |
| *H04L 29/06* | (2006.01) |
| *H04L 29/08* | (2006.01) |
| *H04L 12/58* | (2006.01) |
| *H04L 12/18* | (2006.01) |

(52) U.S. Cl.
CPC .......... *H04L 51/18* (2013.01); *H04L 12/1813* (2013.01); *H04L 51/02* (2013.01)

(58) Field of Classification Search
CPC ...... H04L 12/1813; H04L 51/18; H04L 51/02
USPC ........................................................ 706/1–62
See application file for complete search history.

(56) References Cited

U.S. PATENT DOCUMENTS

| | | |
|---|---|---|
| 8,027,879 B2 | 9/2011 | Ramer et al. |
| 8,131,271 B2 | 3/2012 | Ramer et al. |
| 8,195,133 B2 | 6/2012 | Ramer et al. |

(Continued)

OTHER PUBLICATIONS

De Bayser, M., G., et al., "A Hybrid Architecture for Multi-Party Conversational Systems", 2017, retrieved from arXiv.org Sep. 8, 2019 https://arxiv.org/abs/1705.01214 published online May 2017 (Year: 2017).*

(Continued)

*Primary Examiner* — Brandon S Cole
(74) *Attorney, Agent, or Firm* — Hunton Andrews Kurth LLP (57) ABSTRACT

A chatbot in the context of a chat group messaging is described. The chat group can include a plurality of users and a chatbot. A set of rules can be defined for the users of the group granting each user a privilege status. The chatbot can receive a request through a message transmitted to the chat group. The chatbot can discern a task associated with the message, and perform the task or ask another module to perform the task. Once the task is performed, the chatbot can report the results to the chat group. The chatbot can include a conflict resolution module which can resolve conflicts. The conflict resolution module can use each user's privilege status to resolve the conflicts.

18 Claims, 2 Drawing Sheets

(56) References Cited

U.S. PATENT DOCUMENTS

| | | | |
|---|---|---|---|
| 8,666,376 B2 | 3/2014 | Ramer et al. | |
| 10,498,724 B2* | 12/2019 | Chander | G06Q 30/0645 |
| 2004/0260820 A1* | 12/2004 | Bearman | H04L 63/105 |
| | | | 709/229 |
| 2005/0060638 A1* | 3/2005 | Mathew | G06Q 10/10 |
| | | | 715/255 |
| 2008/0214152 A1 | 9/2008 | Ramer et al. | |
| 2008/0214204 A1 | 9/2008 | Ramer et al. | |
| 2008/0215428 A1 | 9/2008 | Ramer et al. | |
| 2008/0215429 A1 | 9/2008 | Ramer et al. | |
| 2008/0229199 A1* | 9/2008 | Richardson | G06F 16/90 |
| | | | 715/714 |
| 2009/0076889 A1* | 3/2009 | Jhanji | H04L 51/20 |
| | | | 709/223 |
| 2009/0198566 A1* | 8/2009 | Greenberg | G06Q 30/02 |
| | | | 707/727 |
| 2010/0030578 A1 | 2/2010 | Siddique et al. | |
| 2011/0264745 A1* | 10/2011 | Ferlitsch | H04L 12/1827 |
| | | | 709/205 |
| 2012/0069131 A1* | 3/2012 | Abelow | G06Q 10/067 |
| | | | 348/14.01 |
| 2013/0215116 A1 | 8/2013 | Siddique et al. | |
| 2014/0164532 A1* | 6/2014 | Lynch | H04L 12/1818 |
| | | | 709/206 |
| 2015/0200785 A1* | 7/2015 | Gupta | H04L 67/22 |
| | | | 709/204 |
| 2016/0196561 A1* | 7/2016 | Iyer | G06Q 30/016 |
| | | | 705/304 |
| 2016/0248778 A1* | 8/2016 | Erdal | G06Q 50/01 |
| 2017/0324695 A1* | 11/2017 | Fischer | H04L 51/24 |

OTHER PUBLICATIONS

Seering, J., et al., "The Social Roles of Bots: Situating Bots in Discussions in Online Communities", 2018, Proceedings of the ACM on Human-Computer Interaction, vol. 2, No. CSCW, Article 157. Publication date: Nov. 2018, pp. 157:1-157:29. (Year: 2018).*

Avula, S., et al., "SearchBots: User Engagement with ChatBots during Collaborative Search", 2018, CHIIR '18, Mar. 11-15, 2018, New Brunswick, NJ, USA (Year: 2018).*

* cited by examiner

CONVERSATION AGENT FOR COLLABORATIVE SEARCH ENGINE

BACKGROUND

A chatbot can be a computer program which conducts a conversation with a human user. Many service providers take advantage of chatbots in their technical as well as business operations. For example, some use chatbots for information gathering purposes and others use chatbots for customer service operations.

SUMMARY

A chatbot in the context of a chat group messaging is described. The chat group can include a plurality of users and a chatbot. A set of rules can be defined for the users of the group granting each user a privilege status. The chatbot can receive a request through a message transmitted to the chat group. The chatbot can discern a task associated with the message, and perform the task or ask another module to perform the task. Once the task is performed, the chatbot can report the results to the chat group. The chatbot can include a conflict resolution module which can resolve conflicts. The conflict resolution module can use each user's privilege status to resolve the conflicts.

DETAILED DESCRIPTION

Chatbot

A chatbot (also known as a smartbot, talkbot, chatterbot, Bot, IM bot, interactive agent, Conversational interface or Artificial Conversational Entity) can be a computer program or an artificial intelligence which conducts a conversation via auditory or textual methods. A chatbot can provide a conversational experience for interaction with users. In one example, a user can type a question, the chatbot can interpret the question and then provide an answer. In another example, a chatbot can ask a question or ask a user to provide certain information to the chatbot. The user can provide a response to the chatbot which can classify the information in the response, and act according to the information. A chatbot can be used in a dialog system for various purposes, e.g., customer service or information acquisition.

In an example embodiment, a chatbot can receive requests from multiple users. The chatbot can follow the conversation and ascertain the intent of each request provided by each user. Based on the intent, the chatbot can perform a task. If another user submits another request, the chatbot can update its understanding of the intent of the conversation and act accordingly.

In an example embodiment, a chatbot can use natural language processing systems or techniques. For example, the chatbot can use intent classification techniques. Intent classification can be a natural language understanding ("NLU") task that would be used to understand at a high level what tasks the chatbot should be performing. The intent can be hard-coded with a rules-based system with regular expression (i.e., scanning the words) or train a supervised machine learning classification model on labeled examples. Many machine learning models can be used for this purpose, e.g., a neural net (or deep learning), a recurrent neural net such as LSTM, decision tree-based methods like random forest or gradient boosted machines, support vector machine, logistic regression, etc.

The processing system can also include some preprocessing modules to convert text into character, word, or sentence embeddings that can be fed into the model. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

Once the processing system knows the intent of the conversation (e.g., the user is providing car information for chatbot to search; the user is telling chatbot to undo a previous search term; and the user is asking a different user to provide feedback, etc.), the chatbot can perform the task associated with the intent. This can involve named entity recognition ("NER") to extract the specific information that the chatbot needs to fulfill the request. If the chatbot does not find the information it needs, the chatbot can ask further questions to get the required information. NER can be implemented with regular expressions or more complicated statistical models.

In another example embodiment, a chatbot can scan for keywords within a request or message. The chatbot can associate a task with certain keywords included in the request. For example, if there is a "Hello" keyword in the request, the chatbot can associate this keyword with the task of greeting. The chatbot can reply to the request based on the task associated with the keyword. For example, the chatbot can reply a greeting phrase in response to receiving a greeting task.

In an example embodiment, a chatbot can receive a request to perform a search for a product. The chatbot can analyze the request and associate a task with the request. In this case, the chatbot can associate searching for the product with the request. Subsequently, the chatbot can search a database or a website and retrieve the search results. The chatbot can perform various tasks on the search results, e.g., filtering. The chatbot can also transmit some or all of the search results to a user. In some embodiments, after analyzing the request, the chatbot can transmit the request to another module to perform the task associated with the request. For example, after determining that the user is asking the chatbot to search for a product, the chatbot can submit a search query to a server to retrieve the search results.

In an example embodiment, a user can submit a request to a chatbot and the request can include a file. The chatbot can analyze the request and determine a task in connection with the request. For example, a user can send a photo of a car to a chatbot and ask the chatbot to determine the year, make and model of the car. The chatbot can determine that an object recognition task needs to be performed on the photo. The chatbot can transmit the photo to a module for object recognition. The module can use various object recognition and machine learning techniques to identify the car included in the photo. The module can transmit the information of the car to the chatbot and the chatbot can transmit this information to the user. In an example embodiment, the chatbot can automatically search for the specific make and model of the vehicle once it receives the information from the module and return the search results to the user. In another embodiment, the chatbot can prompt the user if the user wants to search for the car, and if the user says yes, the chatbot will search for the car or similar cars.

Communication with the Users

In an example embodiment, a chatbot can be implemented on a server, and the server can be in communication with a network, e.g., cellular network, the Internet, etc. For example, through the cellular network, the chatbot can send or receive communications, e.g., text messages, phone calls, video communication, files, etc. The chatbot can receive text messages from the cellular network and the chatbot can transmit text messages to the cellular network. Additionally, one or more users can receive text messages from the cellular network and the one or more users can transmit text messages to the cellular network. Through the cellular network, the one or more users can transmit text messages to the chatbot and the chatbot can receive the text messages. Additionally, through the cellular network, the chatbot can transmit text messages to the one or more users and the one or more users can receive the text messages.

In an example embodiment, a chatbot can be in communication with a messaging application. The messaging application can be an application or platform that enables messaging or file sharing between the users or devices using the application or platform. For example, through the messaging application, the one or more users can transmit messages to the chatbot and the chatbot can receive the messages. Additionally, through the messaging application, the chatbot can transmit messages to the one or more users and the one or more users can receive the messages.

In some embodiments, the messaging application can enable file sharing between the chatbot and the users. For example, the users can transmit files to the chatbot and include a request in connection with the file. In one embodiment, the user can ask the chatbot to find certain information about an object depicted in a photo or video. In response, the chatbot can transmit the photo or video to a module which can analyze the photo or video. The module can ascertain certain information about the object. The module can transmit the information to the chatbot and the chatbot can relay the information to the user.

In some embodiments, the messaging application can offer messaging as part of a social media platform. In this embodiment, the chatbot can have access to the social media profile of the user or users who join the chat group. Using the information stored on the profile of each user, the chatbot can customize the chatbot's response to user commands or instructions. For example, if the respective profile of each user indicates an age of less than 30 years, the chatbot can craft the search such that sports cars are prioritized over other cars, e.g., the first result will be a sports car. In an example embodiment, each user's search history or interactions with the chatbot can be stored in a database. This database can belong to the chatbot or it can belong to the social media platform. A user's search history can be used to recommend search results on future searches. For example, if a user narrows car searches by price, the user's future searches can be narrowed the same way, e.g., by price.

Figure 1:
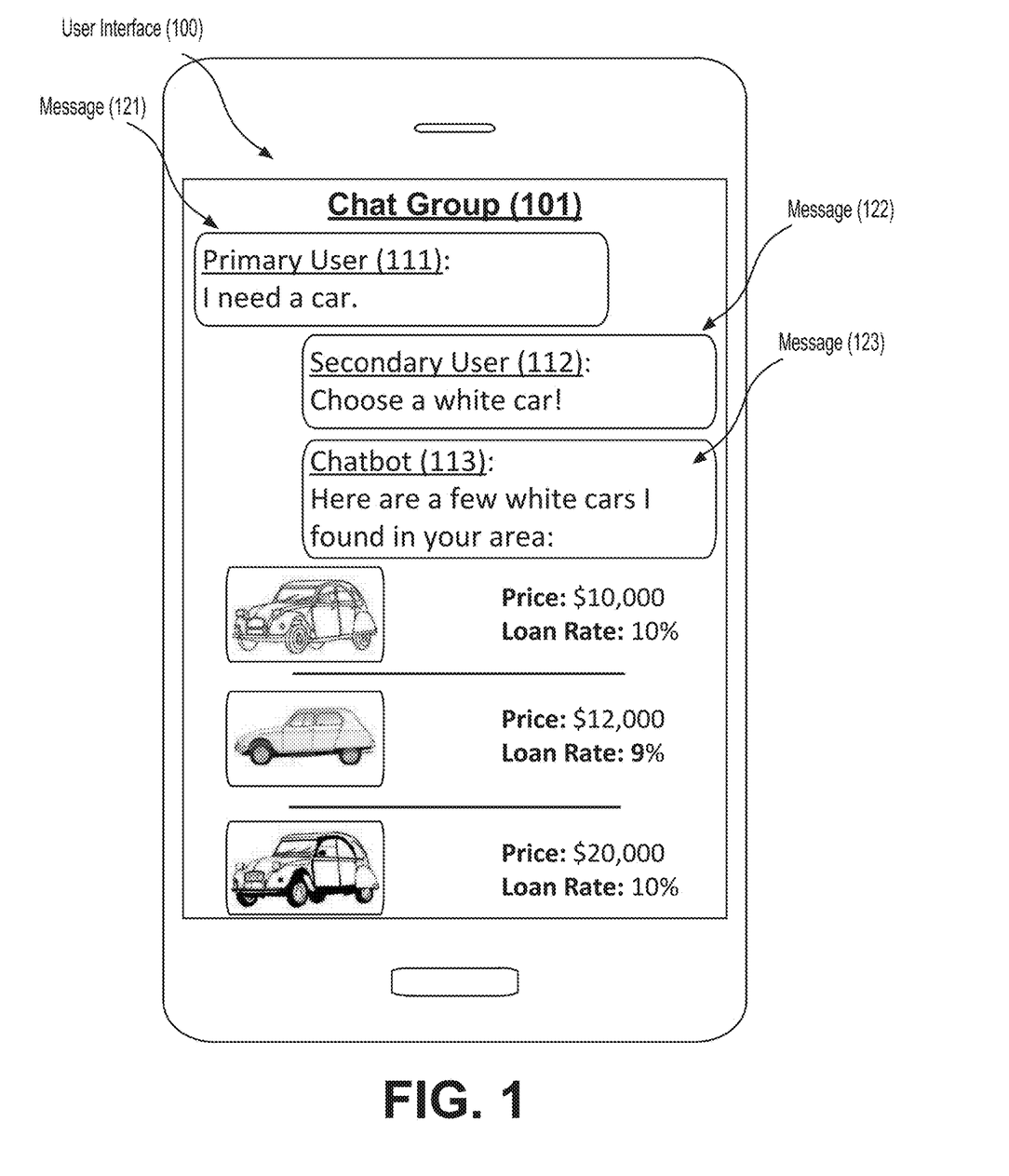
FIG. 1 shows a user interface of a messaging application.

FIG. 1 shows a user interface 101 of a messaging application. In this example embodiment, a primary user 111, a secondary user 112 and a chatbot 113 are included in a chat group 101. The primary user 111 can send a message 121 to the chat group 101 initiating a search for a car. In response, the secondary user 112 can send a message 122 suggesting a filter, i.e., color, for the search. The chatbot 113 transmits a message 123 to the group chat 101. The message 123 can include the search results for cars in the user's area. In this example embedment, the user interface 100 can display a photo of each car found in the user's area.

Chat Group

In an example embodiment, a user can create a chat group including a plurality of users and at least one chatbot. Each one of the group members (i.e., the users and the chatbot) can create a message and transmit the message to the chat group. This means that the message can be disseminated to all members of the group. The chat group can create a medium for the users and the chatbot to exchange messages, data, files, etc. In some embodiments, the group can include users with different privileges. For example, the user who starts the chat group can be the primary user and can decide the other user's privileges.

In an example embodiment, a user intends to shop for a product, e.g., a car. The user can decide what car to buy with the help of the user's friends. The user can add the friends to a chat group. The user can also add a chatbot to the chat group. The user or the friends can send a text message to the chat group to start the conversation about the product. For example, the user can send a text message which indicates the user's interest in a 2-years old car with less than 30,000 miles. The friends can make suggestions and recommendations to the user and the chatbot can search for cars based on the friends' suggestions and recommendations. For example, one friend can recommend an SUV. The chatbot can understand the flow of the conversation and determine that it needs to search for an SUV which is 2-years old with less than 30,000 miles. Based on this determination, the chatbot can search a car inventory and retrieve the search results.

Resolution Algorithm

In an example embodiment, a chatbot can receive requests that are "different." The chatbot can include a resolution algorithm or module for analyzing the "different" requests and determining what task is being asked of the chatbot.

The requests can be "different" if the requests conflict or even overlap. For example, a first user can ask the chatbot to display red cars available to the user in the user's area and a second user can ask the chatbot to display blue cars. The chatbot can determine that the first request conflicts with the second request because the set including the red cars in the user's area is not the same as the set including the blue cars. As another example, the first user can ask the chatbot to display red cars and the second user can ask the chatbot to display new cars. The chatbot can determine that the first request overlaps with the second request because the set including the red cars can include some of the cars included in the set including the new cars.

In one example embodiment, the resolution algorithm can address requests that are "different" by considering which user makes the request. Each chat group can include at least one primary user. The users other than the primary user can be secondary users. The resolution algorithm can prioritize the primary user's requests over the secondary users' requests. For example, the user who initiates the chat group can be the primary user and the users who join later can be the secondary users. In this example embodiment, if there are different requests, the resolution algorithm can always resolve the difference in favor of the primary user.

In one embedment, the resolution algorithm resolves "different" requests based on the nature of the difference. For example, the resolution algorithm can resolve conflicts in favor of the primary user but the resolution algorithm can resolve the overlapping requests in favor of the secondary users. The rationale can be that the primary user should be able to decide the main topic of the conversation, but the secondary users should help the primary user to focus the conversation.

In another example embodiment, the resolution algorithm can use a weight system to address different requests. For example, the resolution algorithm can assign a preference weight to each user's preference and the resolution algorithm can resolve differences based on the weight assigned to each user who makes a request. In one embodiment, every user has the same preference weight as every other user. Therefore, if two users make the same request but a third user makes a different request, the resolution algorithm proceeds according to the request made by the first two users. In another embodiment, every user has the same preference weight as every other user. The resolution algorithm can resolve conflicts in favor of the request which receives the highest total preference weight, but the resolution algorithm can resolve overlaps in favor of the request which receives the second highest total preference weight. In yet another embodiment, the primary user receives a higher preference weight than every other user. Therefore, the primary user can overturn every other user, but few of the users can join forces and overturn the primary user.

In another example embodiment, the resolution algorithm uses a linear updating mechanism. The resolution algorithm addresses "different" requests by considering a temporal aspect of each request, e.g., the latest request can override a prior different request. For example, a chatbot can receive two text messages. The first text message can ask the chatbot to perform a first task. The second text message can ask the chatbot to perform a second task. In this example embodiment, the chatbot can perform the second task regardless of what the first task is and regardless of who sends out the first or second text messages. As another example, the chatbot can perform the second task only if the first task conflicts with the second task.

In an example embodiment, the chatbot can use a group consensus model for addressing "different" requests. For example, the chatbot can poll the users when it detects "different" requests. In a first example, after detecting "different" requests, the chatbot can send a summary of the requests to the users and ask the users to vote on the request the users want to pursue. In some embodiments, the voting can be based on the count number of the users who vote for each option. In other embodiments, the votes can be weighted, e.g., a user's vote can have a higher weight than another user's vote. The chatbot can make a decision based on the total weight of the votes for each option.

In an example embodiment, the chatbot can ask the primary user for authorization or approval if the chatbot receives "different" requests from secondary users (or users with lower privileges). For example, in a chat group consisting of members of a family, if the kids (i.e., secondary users) pose an idea for a search, the chatbot can ask the parents (i.e., primary users) to confirm whether the chatbot should start a search based on the idea proposed. In one embodiment, the primary can modify the request and ask the chatbot to run the search based on the modified request.

In a second example, the chatbot can directly address a user who has or has not participated in the conversation and ask for the user's opinion about a "difference." For example, if a first user desires to see red cars but a second user desires blue cars, the chatbot can direct a question to a third user. The chatbot can ask the third user which cars the user desires to see. The chatbot can proceed based on the third user's response.

In an example embodiment, the chatbot can wait for a predetermined period of time for a user to respond to a poll or question. If the user does not respond within the predetermined period of time, the chatbot can proceed with the information already provided to the chatbot, e.g., the chatbot can resolve the "difference" with this information. For example, a chatbot poses a poll and only a few users respond to the poll. The chatbot can proceed after a predetermined period of time if there are enough answers to resolve the difference. In one embodiment, the chatbot can wait for a predetermined number of responses before it proceeds. In other words, the waiting can also or alternatively be based on the number of responses received.

As yet another example, the chatbot can proceed after not receiving a response from a user only if the chatbot has waited for a period of time specific to the user or users who have not responded. For example, the chatbot can associate an average inactivity period to each user. The inactivity period can be calculated based on the average time it takes the user to respond to a question or message in prior messages. For example, a first user responds to polls an average of five minutes after the poll is received by the user and a second user responds to polls an average of ten minutes after the poll is received by the user. If the second user does not respond to a poll, the chatbot can proceed after waiting for ten minutes, but the chatbot can proceed after waiting for five minutes if the second user responds to the poll. If multiple users fail to respond to the chatbot, the chatbot can proceed after waiting for the longest average inactivity period associated with the multiple users.

In an example embodiment, the chatbot can send a reminder to each user who has not responded to the poll. For example, if a user has not responded to the poll, the chatbot can send a message to the group message asking the user to respond to the poll. The chatbot can send this message after waiting for the average inactivity period associated with the user.

In an example embodiment, the primary user can define different privileges for each user of the chat group. For example, when the primary user adds each user, the primary user can message the chatbot the level of privilege granted to the user. In one embodiment, some of the users can submit requests and vote on polls but the rest of the users can only vote on polls. In an example embodiment, the user who initiates the chat group can assign one or more users as primary users.

In an example embodiment, when there is a conflict between two requests, the chatbot can add input to the conversation. For example, the chatbot can run the task associated with each request and transmit a piece of information associated with each task. As another example, for a car search chatbot, the users can ask the chatbot to display cars that meet a first condition and a second condition. If the two requests conflict, the chatbot can transmit information about each request. This information can include, e.g., the number of search results for each request, the average price for the cars included in each request, etc. In one embodiment, when there is a conflict, the chatbot can offer information to the users which makes the car selection easier. For example, if one request asks for SUVs and another request asks for sedans, the chatbot can offer car safety information for SUVs and sedans. In yet another embodiment, when there is a conflict, the chatbot can display the search results relating to both requests.

User Feedback

In an example embodiment, a user of a chat group can submit a question or a search request for a product to a chatbot. In response, the chatbot can conduct a search on a database or a website. The search can return a number of search results. The chatbot can ask a follow-up question from the users (or a user can send a follow-up message to the chatbot). The follow-up question can ask the user for a filter condition. The filter condition can be a search condition that can broaden or narrow the scope of the search.

For example, if the number of search results exceeds a threshold number, the chatbot can seek a filter condition. In one embodiment, the filter condition can be a search criteria which narrows or broadens the search such that the number of results fits within the threshold number (or over the threshold number). For example, if the user asks the chatbot to search for red cars located in the user's area, the chatbot can conduct a search and receive more than 500 search results. This number exceeds a search result threshold number of 20. Hence, the chatbot can determine a filter condition should be implemented. In one embodiment, the chatbot sends a message to the chat group indicating the number of search results. The chatbot can also ask the users if they want to narrow the search criteria. In response, one of the users can message an additional condition to the chatbot, e.g., the user can ask the chatbot to focus the search only on SUVs.

In an example embodiment, after conducting the search, the chatbot retrieves too few search results. For example, the chatbot retrieves a number of search results below a threshold value. The chatbot can suggest a filter condition to the user to broaden the scope of the search.

In another embodiment, the chatbot can identify a few filters and send the name of at least one of the filters to the users. For example, the chatbot can determine that the search results can be narrowed by vehicle year, make, model, body type, etc. The chatbot can determine these filters by analyzing the search results, or the database which transmits the search results can provide the names of the filters to the chatbot. The chatbot can send the name of at least one of these filters to the users. For example, the chatbot can inform the users that in response to the users' query about a red car, too many search results are returned. The chatbot can also inform the users that they have the option to narrow the results by specifying a vehicle year, make, model or body type.

In one embodiment, the chatbot can send the user the name of a filter which narrows the search results the most. For example, if specifying the vehicle manufacturer can narrow the search results by at least 20 percent and the vehicle body type can narrow the results by at least 30 percent, the chatbot can inform the user that by selecting a vehicle body type, the user can eliminate at least 30 percent of the search results. Hence, the user (or friends of the user in the chat group) can specify a body type for the vehicle and the chatbot can narrow the search results accordingly.

In another embodiment, the chatbot can recommend a filter condition. The recommendation can be based on a variety of factors, including a user profile of some or all of the users, the product searched for, prior searches by other users of the chatbot, location of the user, etc. For example, the service provider which operates the chatbot can possess certain information about the user which initiates a group chat, e.g., income. Based on the user's income, the chatbot can recommend to the user that a useful filter condition would be to limit the search by specifying a sedan body type for the vehicle.

In one embodiment, the chatbot is connected to a messenger application associated with a social media platform. After creating the group chat, the chatbot can receive profile information for each one of the users added to the group chat. In response to a query by the chatbot, the social media platform can provide this information to the chatbot. Based on the social media profile of some or all of the users, the chatbot can recommend a filter condition to the user.

In one embodiment, the chatbot can inform the user about the number of results retrieved by the chatbot. The chatbot can ask the user if the user desires to specify a filter condition for narrowing the search results. The user can specify a filter condition. If the filter condition can be implemented on the search results, the chatbot implements the filter condition and informs the user about the updated search result.

Displaying the Results

In an example embodiment, after performing the task that the user asked the chatbot to perform, the chatbot can transmit a communication to the user. The communication can be displayed to the user. For example, if the user asks the chatbot to perform a product search, the chatbot can search for the specified product and display some or all of the search results to the user.

In one embodiment, the chatbot can ask the user to specify the format in which the user desires to see the search results. For example, the chatbot can ask the user to display the results as text, links, photos, etc. Based on the user's response, the chatbot can deliver the results in the specified format. In one embodiment, the chatbot can indicate to the user how many search results the chatbot retrieved. The chatbot can ask the user if the user wants to see the results or if the user wants to filter the results. The chatbot can also ask the user if the user wants to see a specified number of results. For example, the chatbot can ask the user if the user wants to see the first 5 results retrieved.

In one example embodiment, the search results are displayable within an application which displays the chat group's messages. For example, the chatbot can transmit a link to the chat group. The application displaying the chat group can also display the content of the link transmitted to the chat group, e.g., a preview photo, the title of the page, etc. In another example embodiment, when a link is transmitted to the user, the user can activate the link in the chat group application. However, the content of the link can be displayed in a separate application.

In one embodiment, after retrieving the search results, the chatbot can text message the search results to the users. After texting the results, the chatbot can ask a follow-up question. For example, the chatbot can ask the users if they prefer to receive the results in the same format.

In one embedment, a user can specify a search condition for a vehicle. After conducting the search, the chatbot can display some or all of the search results retrieved, e.g., by text messaging the link for each search result to the chat group. The user can see the search results. However, after seeing the search results, the user can indicate that the user is not satisfied with the search results. The chatbot can understand this response by the user and display other results or ask the user to redefine the search criteria.

In an example embodiment, after displaying the search results, the chatbot can prompt the chat group to determine if the group is interested in seeing results similar to the search results. For example, if a user of the chat group asked for Ford trucks, after displaying the results, the chatbot can ask if the user is interested in seeing similar vehicles. If the user expresses interest, the chatbot can display results relating or similar to Ford trucks, e.g., GM trucks.

In an example embodiment, after displaying search results, the chatbot can display information relating to the search results. For example, after displaying the cars that the chatbot was able to find, the chatbot transmits financing information to the user. The chatbot can also transmit statistical information relating to the chatbot's search. For example, after searching for red cars, the chatbot can transmit to the group the average price and mileage of the cars found.

A Search Alert

In an example embodiment, a member of a chat group can ask the chatbot to set-up a search alert. The search alert can by a dynamic search algorithm which notifies the user or the chatbot when a new search result is found. For example, for a red car search, if the user sets up an alert, the chatbot can notify the user each time a new red car is found. In some embodiments, the chatbot can dynamically run the search algorithm. However, in other embodiments, the chatbot can instruct another module to run the search algorithm. Each time a new result is retrieved, the module can notify the chatbot. In response, the chatbot can send a message including the new search result to the chat group.

The notifications can be sent periodically (as determined by the user) or they can be sent as new search results are found. For example, a user can specify a period of "daily" to the chatbot. Hence, the chatbot can notify the user only once a day. In one embodiment, the user can set up a threshold search result number. If the number of new search results exceed the threshold number, the chatbot can prompt the user. For example, the chatbot can ask the user if the user wants to see all, some or none of the results. In response, the user can specify that the user desires to see only some of the results.

In an example embodiment, a user can choose a search result as a favorite. In response, the chatbot can store the search result in the chatbot's database. The chatbot can also store the search result in other databases, e.g., a user's social media account or another account. The user can prompt the chatbot to display prior favorites. In response, the chatbot can transmit the previously stored search results to the chat group.

Technical Implementation of the Server

Figure 2:
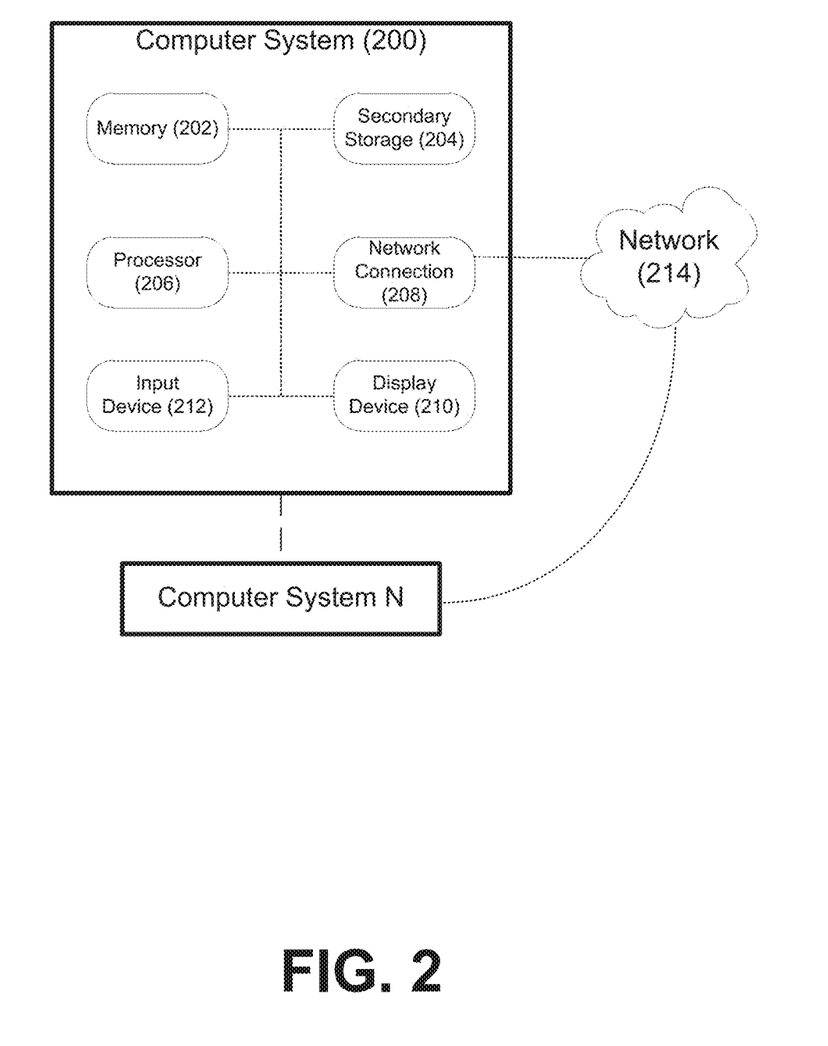
FIG. 2 illustrates exemplary hardware components for a server.

FIG. 2 illustrates exemplary hardware components of a server. A computer system 200, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 200, may run an application (or software) and perform the steps and functionalities described above. Computer system 200 may connect to a network 214, e.g., Internet, or other network, to receive inquiries, obtain data, and transmit information and incentives as described above.

The computer system 200 typically includes a memory 202, a secondary storage device 204, and a processor 206. The computer system 200 may also include a plurality of processors 206 and be configured as a plurality of, e.g., bladed servers, or other known server configurations. The computer system 200 may also include a network connection device 208, a display device 210, and an input device 212.

The memory 202 may include RAM or similar types of memory, and it may store one or more applications for execution by processor 206. Secondary storage device 204 may include a hard disk drive, floppy disk drive, CD-ROM drive, or other types of non-volatile data storage. Processor 206 executes the application(s), such as those described herein, which are stored in memory 202 or secondary storage 204, or received from the Internet or other network 214. The processing by processor 206 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 200 may store one or more database structures in the secondary storage 204, for example, for storing and maintaining the information necessary to perform the above-described functions. Alternatively, such information may be in storage devices separate from these components.

Also, as noted, processor 206 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 200.

The input device 212 may include any device for entering information into the computer system 200, such as a touch-screen, keyboard, mouse, cursor-control device, microphone, digital camera, video recorder or camcorder. The input and output device 212 may be used to enter information into GUIs during performance of the methods described above. The display device 210 may include any type of device for presenting visual information such as, for example, a computer monitor or flat-screen display (or mobile device screen). The display device 210 may display the GUIs and/or output from subsystem components (or software).

Examples of the computer system 200 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 200 is shown in detail, system 200 may use multiple computer systems or servers as necessary or desired to support the users and may also use back-up or redundant servers to prevent network downtime in the event of a failure of a particular server. In addition, although computer system 200 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 200, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
   receiving, from a first client device, a first message including a photo from a first user transmitted through a group messaging interface;
   analyzing a content of the photo using an object recognition technique to determine if a first task is associated with the first message;
   receiving, from a second client device, a second message from a second user transmitted through the group messaging interface;
   analyzing a content of the second message using a natural language processing technique to determine if a second task is associated with the second message;
   determining if there is a conflict between the first task and the second task, wherein:
      each of the first task and the second task is a search query for retrieving results from a website; and
      there is a conflict between the first task and the second task when there is no overlap between a first search result from the website based on the first task and a second search result from the website based on the second task;
   determining a dominant user who is one of the first user or the second user;
   resolving the conflict in favor of the dominant user by selecting a task associated with a message of the dominant user as a dominant task, wherein:
      the message of the dominant user being one of the first message or the second message; and
      the task being the first task or the second task;
   transmitting a signal to a task server to perform the dominant task;
   receiving a task result from the task server, wherein the task result is at least one search hit retrieved from the website and the search hit includes a link; and
   transmitting the task result as a third message to the group messaging interface such that the third message is accessible by the first client device and the second client device, wherein the third message is configured to cause the first client device and the second client device display a preview photo retrievable from the link.

2. The method of claim 1, wherein resolving the conflict in favor of the dominant user is based on a privilege status granted to each of the first user and the second user.

3. The method of claim 2, wherein the dominant user is one of the first user or the second user who has superior privilege status relative to the other user.

4. The method of claim 2, wherein the first user initiated the group messaging interface and the privilege status of the first user is superior to all other users.

5. The method of claim 2, further comprising receiving a privilege message from the first user indicating the privilege status granted to each user of the group messaging interface.

6. The method of claim 1, further comprising:
   receiving a fourth message including a filter criteria; and
   transmitting the filter criteria to the task server.

7. The method of claim 6, further comprising;
   receiving from the task server a second task result; and
   transmitting a fifth message including the second task result to the group messaging interface.

8. The method of claim 1, further comprising:
   receiving from the task server a number indicating how many search hits were retrieved in response to transmitting the dominant task to the task server; and
   transmitting a sixth message to the group messaging interface, the sixth message including the number of search hits.

9. The method of claim 8, further comprising:
   determining if the number of search hits exceeds a threshold number;
   if the number of search hits exceeds the threshold number, determining a filter criteria to be applied to the dominant task; and
   transmitting the filter criteria to the server.

10. The method of claim 9, further comprising:
    receiving from the server a third task result; and
    transmitting the third task result to the group messaging interface.

11. The method of claim 9, wherein the filter criteria is determined based on:
    a seventh message received from the group messaging interface; or
    a second signal received from the server.

12. The method of claim 1, further comprising receiving an eighth message from the group messaging interface, the eighth message requests creating an alert for the dominant task.

13. The method of claim 12, further comprising:
    transmitting the alert to the server;
    transmitting an update to the group messaging interface in response to receiving a third signal from the server; and
    continuing the previous two steps until a ninth message is received requesting cancellation of the alert.

14. The method of claim 13, wherein the continuing step takes place periodically, each instance being separated from a previous instance by a threshold period of time and the threshold period of time is specified by the dominant user.

15. The method of claim 1, further comprising transmitting a poll message to the group messaging interface.

16. The method of claim 15, further comprising:
    receiving a plurality of messages in response to the poll message, each message including an election of a poll choice, each poll choice being associated with one of a plurality of poll tasks; and
    transmitting one of the plurality of poll tasks which is elected the most to the server.

17. The method of claim 16, further comprising:
    classifying the users of the group messaging interface into a plurality of classification groups based on the messages received in response to the poll, wherein each user is assigned to one classification group; and
    transmitting to at least one of the classification groups of the group messaging interface group results based on the poll.

18. A method comprising:

transmitting a first message including a photo from a first client device of a first user to a group messaging interface;

receiving, at the first client device, a second message from a second client device of a second user transmitted through the group messaging interface; and receiving, at the first client device, a task result as a third message transmitted to the group messaging interface, wherein the third message is configured to cause the first client device and the second client device display a preview photo retrievable from a link;

wherein a chatbot is a member of the group messaging interface and the chatbot is configured to:

determine a first task associated with the photo using an object recognition technique and a second task associated with the second message using a natural language processing technique;

determine if there is a conflict between the first task and the second task, wherein:

each of the first task and the second task is a search query for retrieving results from a web site; and there is a conflict between the first task and the second task when there is no overlap between a first search result from the website based on the first task and a second search result from the web site based on the second task;

determine a dominant user who is one of the first user or the second user;

resolve the conflict in favor of the dominant user by selecting a task associated with a message of the dominant user as a dominant task, wherein:

the message of the dominant user being one of the first message or the second message; and the task being the first task or the second task;

transmit a signal to a task server to perform the dominant task; and receive the task result from the task server, wherein the task result is at least one search hit retrieved from the website and the search hit includes the link.

\* \* \* \* \*